(12) United States Patent
Chen et al.

(10) Patent No.: US 12,069,322 B2
(45) Date of Patent: *Aug. 20, 2024

(54) REAL-TIME VIDEO OVERLAYING DISPLAY

(71) Applicant: Loop Now Technologies, Inc., San Mateo, CA (US)

(72) Inventors: Li Chen, San Jose, CA (US); Yang-Cheng Fan, San Jose, CA (US); Ting Kwan Luk, Menlo Park, CA (US); Xinshuo Zhang, Falcon Heights, MN (US); WuHsi Li, Somerville, MA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,056

(22) Filed: Nov. 2, 2022

(65) Prior Publication Data

US 2023/0048234 A1    Feb. 16, 2023

Related U.S. Application Data

(60) Continuation of application No. 17/548,569, filed on Dec. 12, 2021, which is a division of application No.
(Continued)

(51) Int. Cl.
*H04N 21/234* (2011.01)
*H04N 5/272* (2006.01)
(Continued)

(52) U.S. Cl.
CPC ....... *H04N 21/23424* (2013.01); *H04N 5/272* (2013.01); *H04N 21/2187* (2013.01); *H04N 23/90* (2023.01)

(58) Field of Classification Search
CPC .. H04N 21/23424; H04N 5/247; H04N 5/272; H04N 21/2187; H04N 5/2258
See application file for complete search history.

(56) References Cited

U.S. PATENT DOCUMENTS 8,069,414 B2   11/2011   Hartwig et al.
8,244,707 B2    8/2012   Lin et al.
(Continued)

FOREIGN PATENT DOCUMENTS

KR        101606860 B1       3/2016

*Primary Examiner* — Phung-Hoang J Nguyen
(74) *Attorney, Agent, or Firm* — Adams Intellex, PLC

(57) ABSTRACT

Technologies relating to system and method of real-time video overlaying or superimposing display from multiple mutually synchronous cameras are disclosed. An example method of real-time video overlaying includes the steps of: synchronizing frame rates of a depth data, a face metadata, and a video data of a first camera video output captured by a first camera; determining a first depth between a user face and the first camera; using a cutoff depth to determine a user body contour; generating a binary mask of the user body contour based on the first depth and the cutoff depth; smoothing an edge of the binary mask; merging the binary mask with the first camera video output and generating a merged first camera video output; and overlaying the merged first camera video output onto a second camera video output.

35 Claims, 6 Drawing Sheets

Related U.S. Application Data

16/839,081, filed on Apr. 3, 2020, now Pat. No. 11,223,855.

(60) Provisional application No. 62/902,361, filed on Sep. 18, 2019.

(51) Int. Cl.
*H04N 21/2187* (2011.01)
*H04N 23/90* (2023.01)

(56) References Cited

U.S. PATENT DOCUMENTS

| | | |
|---|---|---|
| 8,572,490 B2 | 10/2013 | Hartwig et al. |
| 9,118,712 B2 | 8/2015 | McCoy et al. |
| 9,152,392 B2 | 10/2015 | Petro et al. |
| 9,532,116 B2 | 12/2016 | Terpe |
| 9,608,983 B2 | 3/2017 | Fee |
| 9,645,700 B2 | 5/2017 | Tsai |
| 9,693,013 B2 | 6/2017 | Nesamoney et al. |
| 9,824,372 B1 | 11/2017 | Seth et al. |
| 10,089,402 B1 | 10/2018 | Winkler et al. |
| 10,496,350 B2 | 12/2019 | Lazier et al. |
| 10,955,999 B2 | 3/2021 | Lotinsky et al. |
| 2010/0149359 A1 | 6/2010 | Taoka |
| 2013/0021373 A1 | 1/2013 | Vaught et al. |
| 2013/0097477 A1 | 4/2013 | Adolf et al. |
| 2013/0276021 A1 | 10/2013 | Cho |
| 2014/0101537 A1 | 4/2014 | Antkowiak et al. |
| 2014/0106881 A1 | 4/2014 | Antkowiak et al. |
| 2015/0177940 A1 | 6/2015 | Trevino et al. |
| 2015/0195175 A1 | 7/2015 | Kariman |
| 2016/0065929 A1 | 3/2016 | Barcons-Palau et al. |
| 2016/0088369 A1 | 3/2016 | Terpe |
| 2016/0093105 A1 | 3/2016 | Rimon et al. |
| 2017/0018094 A1 | 1/2017 | Todeschini |
| 2017/0269816 A1 | 9/2017 | Bradley et al. |
| 2017/0323455 A1 | 11/2017 | Bittan et al. |
| 2018/0040304 A1* | 2/2018 | Choi ............... G09G 5/377 |
| 2018/0253765 A1 | 9/2018 | Avedissian et al. |
| 2018/0288396 A1 | 10/2018 | Bouazizi et al. |
| 2019/0251728 A1 | 8/2019 | Stoyles et al. |
| 2019/0259190 A1* | 8/2019 | Kristal ............ G06Q 30/0643 |
| 2019/0342329 A1* | 11/2019 | Turgeman .......... G06F 3/0488 |
| 2021/0019892 A1* | 1/2021 | Zhou ............... G06V 40/161 |

\* cited by examiner

4000
FIG. 4A
4100
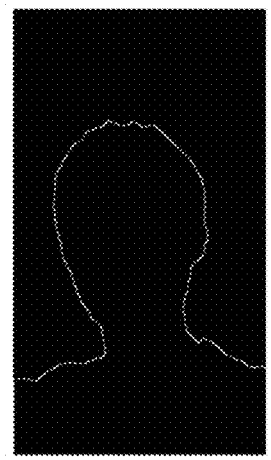
FIG. 4B
4200
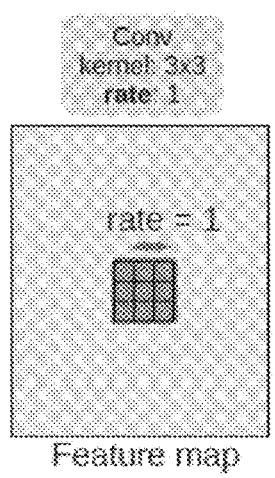 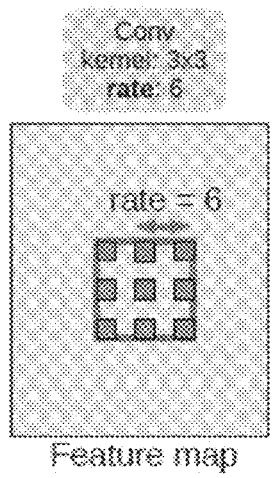 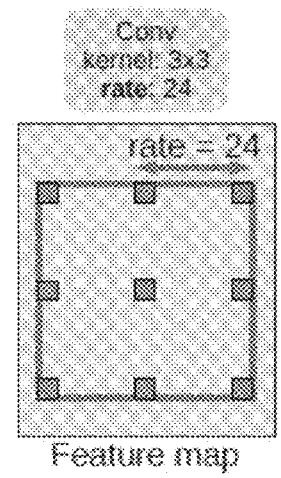
FIG. 4C
4300
$$y[i] = \sum_{k} x[i + r \cdot k] w[k]$$
FIG. 4D

REAL-TIME VIDEO OVERLAYING DISPLAY

RELATED APPLICATIONS

The present application is a continuation of U.S. patent application "System And Method of Real-Time Video Overlaying or Superimposing Display", Ser. No. 17/548,569, filed on Dec. 12, 2021, which is a divisional application of U.S. patent application "System And Method of Real-Time Video Overlaying or Superimposing Display", Ser. No. 16/839,081, filed on Apr. 3, 2020, which claims the benefit of priority of U.S. provisional application "Method of Real-Time Video Overlaying and Superimposing Display from Multiple Mutually-Synchronous Cameras", Ser. No. 62/902,361, filed on Sep. 18, 2019. Each of the foregoing applications is hereby incorporated by reference in its entirety.

FIELD OF ART

The present disclosure relates generally to system and method of real-time video overlaying or superimposing display and more specifically to system and method of real-time video overlaying or superimposing display from multiple mutually synchronous cameras.

BACKGROUND

Traditionally, background overlaying and background superimposing are image processing techniques used in production of visual objects such as images, photographs, videos, films, movies, or motion pictures.

As more and more video contents are produced via mobile phones or any other wearable devices. Conventional techniques such as capturing videos or images from a camera and overlaying the background in a personal computer thereafter are outdated and time-consuming. Further than that, because live streaming platforms such as YouTube, Twitch, Mixer, or other real-time video streaming have a trendy need in creating fashionable video contents, these live streaming content creators would like to have the overlaying techniques to be more accessible, flexible, and easier to use. For instance, if these techniques can be achieved by a system or a method executed via a mobile phone or a wearable device with cameras, a live streamer may overlay or superimpose a background with her selfie in the palm of her hand.

SUMMARY

Technologies relating to system and method of real-time video overlaying or superimposing display from multiple mutually synchronous cameras are disclosed.

An exemplary real-time video overlaying system, in some implementations, includes: a user device including a device body having a first side and a second side; a first camera formed on the first side; a second camera formed on the second side; a depth sensor formed on the first side; and an image processor, wherein the image processor includes: a synchronizer unit configured to synchronize a first video data captured by the first camera, a face metadata captured by the first camera, and a depth data captured by the depth sensor; a binary mask generator unit configured to generate a binary mask from the first video data captured by the first camera; a video smoothing unit configured to smooth an edge of the binary mask; a video transforming unit configured to transform the binary mask to allow a drag-and-zoom feature; a video merger unit configured to merge the binary mask into the first video data, and generating a merged first video data; and a video overlaying unit configured to overlay the merged first video data onto a second video data captured by the second camera.

In some implementations, the user device includes a mobile phone or a wearable device.

The real-time video overlaying system, in some implementations, further includes: an image sensor and a memory.

In some implementations, the image sensor includes a CCD or a CMOS sensor, and the memory includes a hard drive or a flash memory.

An exemplary method of real-time video overlaying includes the steps of:

synchronizing frame rates of a depth data, a face metadata, and a video data of a first camera video output captured by a first camera; determining a first depth between a user face and the first camera; using a cutoff depth to determine a user body contour; generating a binary mask of the user body contour based on the first depth and the cutoff depth; smoothing an edge of the binary mask; merging the binary mask with the first camera video output and generating a merged first camera video output; and overlaying the merged first camera video output onto a second camera video output.

In some implementations, the first camera and the second camera are facing in the opposite direction.

In some implementations, the first depth is determined by a depth sensor.

In some implementations, the step of synchronizing frame rates includes synchronizing the frame rate to 60 FPS.

In some implementations, any point on the binary mask further than the user body contour is set to a value of 0, and any image point falls within the user body contour is set to a value of 1.

The method of real-time video overlaying, in some implementations, further includes: applying a low pass filter on the binary mask after generating the binary mask of the user body contour.

In some implementations, the step of applying the low pass filter on the binary mask after generating the binary mask of the user body contour further includes: temporarily buffering a last binary mask that corresponds to a last frame, and then mixing the last binary mask with a current binary mask that corresponds to a current frame, and then generating the binary mask according to a combination of the last frame and the current frame.

In some implementations, the combination of the last frame and the current frame follows an exemplary equation: the binary mask=last frame * 0.4+current frame * 0.6.

In some implementations, the step of smoothing an edge of the binary mask further includes: creating a first alpha matte on the binary mask.

In some implementations, the step of smoothing the edge of the binary mask further includes: upscaling the first alpha matte to RGB resolution after creating the first alpha matte on the binary mask.

The method of real-time video overlaying, in some implementations, further includes a step of: smoothing the binary mask by applying a gamma adjust process and a gaussian blur process; and transforming the binary mask to allow a drag-and-zoom feature.

In some implementations, the step of applying the gamma adjust process further includes applying a CIGammaAdjust filter.

In some implementations, the step of applying the gaussian blur process further includes applying a CIGaussianBlur filter.

In some implementations, the step of transforming the binary mask further includes: scaling the binary mask to the same size as the second camera video output.

In some implementations, the step of transforming the binary mask further includes: placing the binary mask at a position corresponding to a bottom center of the second camera video output after scaling the binary mask to the same size as the second camera video output.

In some implementations, the step of merging the binary mask with the first camera video output and generating the merged first camera video output further includes: applying a second alpha matte to the first camera video output; correcting an orientation of the first camera video output; and applying a CIBlendWithMask filter to merge the first camera video output with the binary mask.

BRIEF DESCRIPTION OF THE DRAWINGS

FIG. 4A is an exemplary image illustrating the exemplary extracted image using a DeepLabV3 model.

FIG. 4B is an exemplary image illustrating the exemplary extracted image using a TrueDepth 3D sensor.

FIG. 4C is an exemplary figure map illustrating Atrous Convolution with different rates r in accordance with DeepLabV3 implementations.

FIG. 4D is the exemplary equation of DeepLabV3 in accordance with DeepLabV3 implementations.

The implementations disclosed herein are illustrated by way of example, and not by way of limitation, in the figures of the accompanying drawings. Like reference numerals refer to corresponding parts throughout the drawings.

DETAILED DESCRIPTION

Technologies relating to system and method of real-time video overlaying or superimposing display from multiple mutually synchronous cameras are disclosed. The technologies described in the present disclosure may provide the following technical advantages.

First, the disclosed technology utilizes only a mobile device or a wearable device to perform real-time video overlaying display from two synchronous cameras in one device which is highly favorable for live online streaming applications.

Second, with a synchronizing process applying on video data, depth data, and face metadata captured by the front camera, the disclosed technology may generate a binary mask of the same frame rate with live video and allow real-time video processing. This enables a subsequent overlaying process to overlay the face video with the background video.

Third, the disclosed technology provides several smoothing and transforming processes on the real-time video which makes the video fit into the background without looking like a shadow or silhouette. This also includes techniques that make the live video streamer be able to jump or move dynamically. Some techniques of the present disclosure provide drag-and-zoom functions as well. The present disclosure allows live online streamers to interact with audiences much more easily and more flexibly in any kind of outdoor video.

Finally, the disclosed technology may not only overlay or superimpose the selfie video with background video but also overlay the selfie video with another selfie video in another camera. This provides more possibilities and capabilities for live streaming applications in the future.

Figure 1:
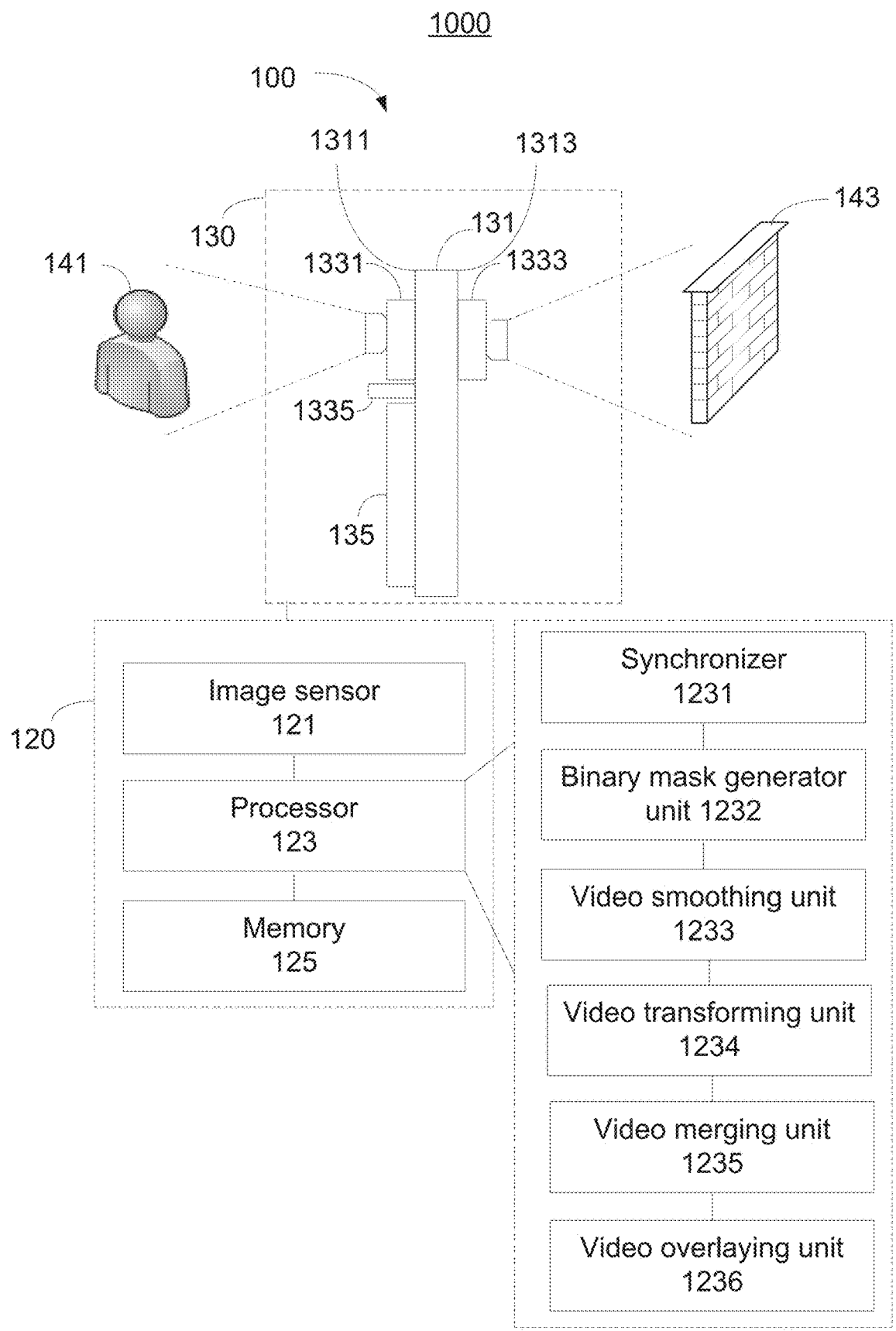
FIG. 1 is a schematic diagram illustrating an example real-time video overlaying system in accordance with some implementations of the present disclosure.

FIG. 1 is a schematic diagram 1000 illustrating an example real-time video overlaying system 100 in accordance with some implementations of the present disclosure.

As shown in FIG. 1, the real-time video overlaying system 100 includes a user device 130 and an image processing unit 120. The user device 130 includes a device body 131 having a first side 1311 and a second side 1313; a first camera 1331 formed on the first side 1311 of the device body 131; a second camera 1333 formed on the second side 1313 of the device body 131; a depth sensor 1335 formed on the first side 1311 of the device body 131; and a display 135 formed on the first side 1311 of the device body 131.

In some implementations, the user device 130 includes an electronic device such as a mobile phone, or a wearable device.

In some implementations, the first camera 1331 is a front camera of a mobile phone, and the second camera 1333 is a back camera of the mobile phone. Therefore, the two cameras are formed at opposite sides of the user device 131 and thus have opposite camera view. This allows the user device 130 to capture a first video of a first user face 141 and a second video of a background view 143 synchronously with contradictory visions.

In some implementations, the depth sensor 1335 may be embedded on the first camera 1331.

Next, the image processing unit 120 includes an image sensor 121, an image processor 123, and a memory 125.

In some implementations, the image processing unit 120 may be implemented in the user device 130. In some implementations, the image processing unit 120 may be a part of the user device 130. For example, it can be embedded in the device body 131. In some implementations, a part of the image processing unit 130 may be remotely located outside of the user device (i.e., the image processor 123 may be located beyond the user device) because it can be a cloud-based computation, and therefore, it is not arranged on the user device 130.

In some implementations, the image sensor 121 is configured to convert light waves captured via cameras into signals such as analog signals, digital signals, or optical signals. In some implementations, the image sensor 121 includes a charge-coupled device (CCD) and the active-pixel sensor (CMOS sensor).

In some implementations, the image processor 123 is configured to provide several image processing units including (1) a synchronizer unit 1231 configured to synchronize a first video data captured by the first camera 1331, face metadata captured by the first camera 1331, and a depth data captured by the depth sensor 1335, (2) a binary mask generator unit 1232 configured to generate a binary mask from the first video data captured by the first camera 1331 to be processed and modified, (3) a video smoothing unit 1233 configured to smooth an edge of the binary mask, (4) a video transforming unit 1234 configured to transform the binary mask to allow a drag-and-zoom feature, (5) a video merging unit 1235 configured to merge the binary mask with the first video data, and generating a merged first video data, and (6) a video overlaying unit 1236 configured to overlay the merged first video data onto a second video data captured by the second camera. The image processing units and the functions of the above image processor 123 may be implemented by using image processing methods and corresponding codes or algorithms in accordance with some implementations of the present disclosure. These image processing methods and corresponding codes and algorithms will be discussed in detail in a subsequent section.

In some implementations, the memory 125 includes a hard drive or a flash memory. The memory 125 is configured to provide temporary or permanent data storage including storage of depth data; image data; or video data before, during, or after the real-time video overlaying process.

Figure 2:
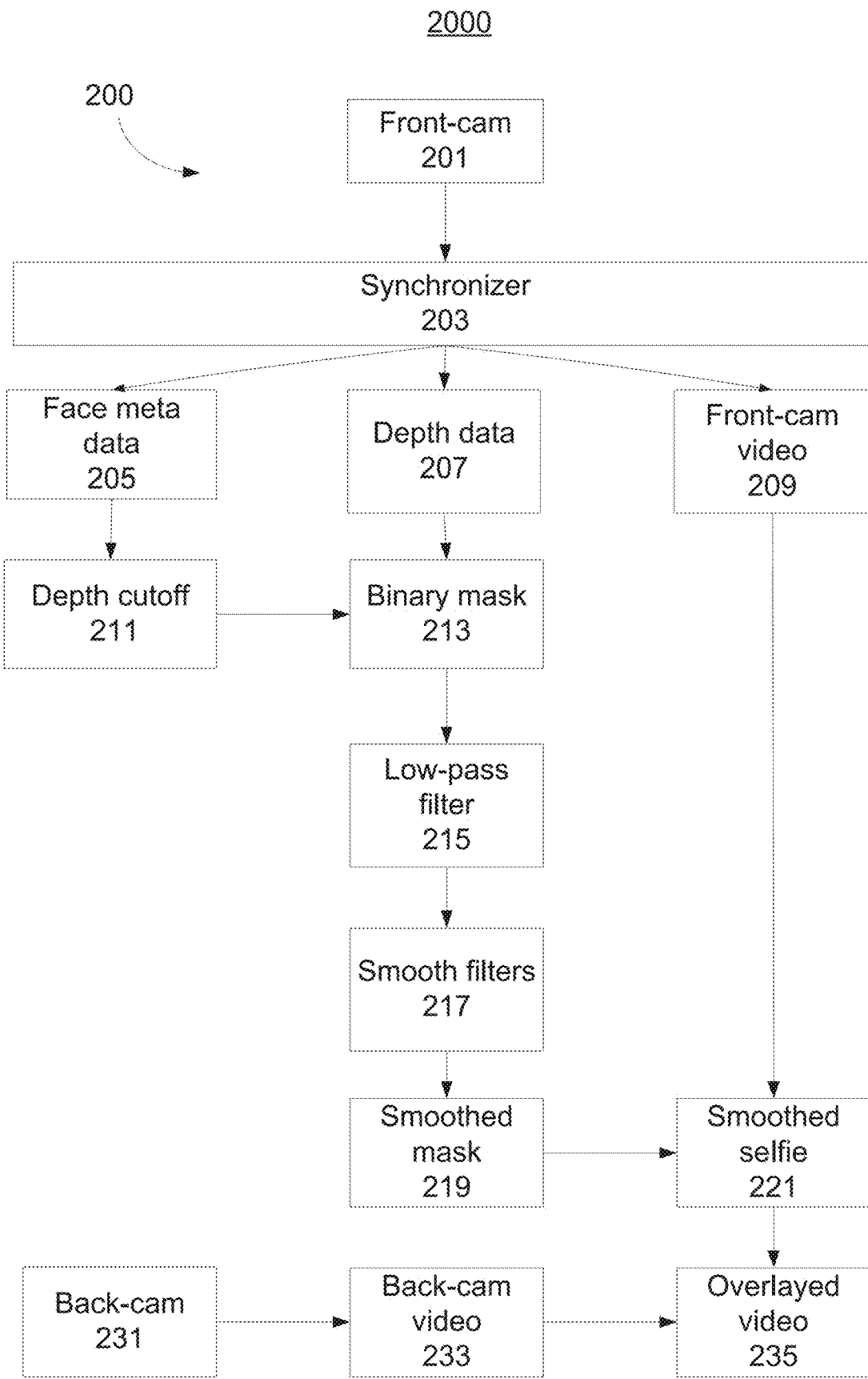
FIG. 2 is a flowchart illustrating a method of real-time video overlaying and superimposing display from multiple mutually synchronous cameras in accordance with some implementations of the present disclosure.

FIG. 2 is a flowchart 2000 illustrating a method 200 of real-time video overlaying and superimposing a display from multiple mutually synchronous cameras in accordance with some implementations of the present disclosure.

As shown in FIG. 2, the method 200 includes capturing a first video via a front camera 201; and synchronizing face metadata 205, depth data 207, and the first video of the front camera 209 into the same frame rate, e.g., a 60 frames-per-second (FPS). As mentioned above, the front camera, the back camera, and the depth sensor may be clocked differently. For example, the front camera and the depth sensor may have different frame rates. For them to work together, a synchronizing process is required to synchronize the frame rate.

In some implementations, an AVCaptureDataOutputSynchronizer from Apple may be used to achieve the synchronizing process. The AVCaptureDataOutputSynchronizer is an object that coordinates time-matched delivery of data from multiple capture outputs.

Next, after the synchronizing process, a real-time body segmentation process and an edge-smoothing process are performed.

Conventionally, a segmentation process may be done by processing the front camera output frame by frame by using the DeepLabV3 model or TrueDepth 3D sensor. FIG. 4A is an image illustrating the exemplary extracted image using the DeepLabV3 model. FIG. 4B is an image illustrating the exemplary extracted image using the TrueDepth 3D sensor.

FIG. 4C illustrates the exemplary figure map for Atrous Convolution with different rates r in accordance with DeepLabV3 implementations. And FIG. 4D illustrates the exemplary equation of DeepLabV3 in accordance with DeepLabV3 implementations. For DeepLabV3, each location I on the output y and a filter w, the Atrous Convolution is applied over the input feature map x where the atrous rate r corresponds to the stride with which we sample the input signal. This is equivalent to convolving the input x with upsampled filters produced by inserting (r-1) zeros between two consecutive filter values along each spatial dimension, (trous means holes in English.) When r=1, it is standard convolution. By adjusting r, we can adaptively modify the filter's field-of-view. It is also called dilated convolution (DilatedNet) or Hole Algorithm.

Top: Standard convolution

Bottom: Atrous convolution

We can see that when r-2, the input signal is sampled alternatively. First, pad-2 means we pad 2 zeros at both the left and right sides. Then, with r=2, we sample the input signal every 2 inputs for convolution. Atrous convolution allows us to enlarge the field of view of filters to incorporate large context. It thus offers an efficient mechanism to control the field-of-view and finds the best trade-off between accurate localization (small field-of-view) and context assimilation (large field-of-view). In some examples, Atrous convolution applies a mechanism named Atrous Spatial Pyramid Pooling (ASPP). However, these two approaches may not deliver results in real-time.

Back to implementations of the present disclosure, the depth data hereinafter is important to aid the body segmentation in the present disclosure. And some smoothing techniques are also used to make sure the results are not degraded.

As shown in FIG. 2, the method 200 further includes checking whether there is a face in the face metadata feed 205. If so, determining a center point of the face, and collecting a depth data 207 between the center point of the face and the front camera. A cutoff depth is determined in advance to allow the whole body to appear in the video and to account for distance measuring errors. In some implementations, the cutoff depth is 0.25 meters.

In some implementations, the method 200 further includes setting a maximum depth, so that the user can do something fun like "jumping" into the video from nowhere. Therefore, in some implementations, the maximum depth may be set to 1.2 meters to allow for the "jump-in" effect of the video.

The exemplary codes to execute the steps above of the method 200 may be as follows:

```
if let firstFace = syncedMetaData?.metadataObjects.first,
    let connection = sessionManager.frontCameraVideoDataOutput.connection(with:
AVMediaType.video),
    let face = sessionManager.frontCameraVideoDataOutput.transformedMetadataObject(for:
firstFace, connection: connection) {
        let faceCenter = CGPoint(x: face.bounds.midX, y: face.bounds.midY)
        let scaleFactor = CGFloat(CVPixelBufferGetWidth(depthPixelBuffer)) /
CGFloat(CVPixelBufferGetWidth(videoPixelBuffer))
        let pixelX = Int((faceCenter.x * scaleFactor).rounded( ))
        let pixelY = Int((faceCenter.y * scaleFactor).rounded( ))
        if pixelX < depthHeight && pixelX >= 0 && pixelY < depth Width && pixelY >= 0 {
            CVPixelBufferLockBaseAddress(depthPixelBuffer, .readOnly)
            let rowData = CVPixelBufferGetBaseAddress(depthPixelBuffer)! + pixelX *
```

```
CVPixelBufferGetBytesPerRow(depthPixelBuffer)
    let faceCenterDepth = rowData.assumingMemoryBound(to: Float32.self)[pixelY]
    CVPixelBufferUnlockBaseAddress(depthPixelBuffer, .readOnly)
    // 1.2 is a number to allow for "jump-in" effect
    sessionManager.depthCutOff = min(faceCenterDepth + 0.25, 1.2)
  }
}
```

Next, in order to perform real-time video processing, the method 200 further includes generating a binary mask 213 of the user's body contour by using the cutoff depth from the previous step. Any point further than the user's body contour will be set a value of 0 and will eventually be filtered off. Also, with the aid of the binary mask, any image point that falls within the user's body contour will be assigned a non-zero value, e.g., 1, such that the image point will be kept. By assigning binary values to image points, the method 200 may effectively process image points without introducing a heavy cost. This enables the system to do the calculation in real-time at, for example, 60 FPS.

Although it is a great solution to do real-time video processing, it should be noted that the depth data feed has a very low resolution. Therefore, the resulting image is very sensitive to lighting conditions, especially on the edges of the body contour. Moreover, such a phenomenon will render a constantly changing binary mask which may sabotage the final result.

To deal with such a phenomenon, the method 200 further includes applying a low pass filter (LPF) 215 on the binary mask 213. More specifically, the method 200 further includes temporarily buffering a last binary mask that corresponds to a last frame (lastData), and then mixing the last binary mask with a current binary mask that corresponds to a current frame (currentData). In this way, a final result is generated according to the following exemplary equation:

$$filteredResult = lastData*0.4 + currentData*0.6$$

With the aid of the LPF, this generates a good final result at a low computational cost.

One of the exemplary codes to achieve the above goal may be as follows:

```
CVPixelBufferLockBaseAddress(depthPixelBuffer, CVPixelBufferLockFlags(rawValue: 0))
  if let lastDepthDataPixelBuffer = lastDepthDataPixelBuffer {
    CVPixelBufferLockBaseAddress(lastDepthDataPixelBuffer,
CVPixelBufferLockFlags(rawValue: 0))
    if CVPixelBufferGetWidth(lastDepthDataPixelBuffer) != depthWidth ||
CVPixelBufferGetHeight(lastDepthDataPixelBuffer) != depthHeight {
      self.lastDepthDataPixelBuffer = nil
    }
  }
  for yMap in 0 ..< depthHeight {
    let rowData = CVPixelBufferGetBaseAddress(depthPixelBuffer)! + yMap *
CVPixelBufferGetBytesPerRow(depthPixelBuffer)
    let lastRowData : UnsafeMutableRawPointer? = (lastDepthDataPixelBuffer != nil) ?
      CVPixelBufferGetBaseAddress(lastDepthDataPixelBuffer!)! + yMap *
CVPixelBufferGetBytesPerRow(lastDepthDataPixelBuffer!)
      : nil
    let data = UnsafeMutableBufferPointer<Float32>(start: rowData.assumingMemoryBound(to:
Float32.self), count: depthWidth)
    let lastData : UnsafeMutableBufferPointer<Float32>? = (lastRowData != nil) ?
      UnsafeMutableBufferPointer<Float32>(start: lastRowData!.assumingMemoryBound(to:
Float32.self), count: depthWidth)
      : nil
    for index in 0 ..< depthWidth {
      if data[index] > 0 && data[index] <= sessionManager.depthCutOff {
        data[index] = 1.0
      } else {
        data[index] = 0.0
      }
      if let lastData = lastData {
        let lowPassFilterFactor:CGFloat = 0.4
        let current = data[index] * Float32(1.0-lowPassFilterFactor)
        let last = lastData[index] * Float32(lowPassFilterFactor)
        data[index] = current + last
      }
    }
  }
  if let lastDepthDataPixelBuffer = lastDepthDataPixelBuffer
    CVPixelBufferUnlockBaseAddress(lastDepthDataPixelBuffer,
CVPixelBufferLockFlags(rawValue: 0))
  }
  CVPixelBufferUnlockBaseAddress(depthPixelBuffer, CVPixelBufferLockFlags(rawValue:
0))
    lastDepthDataPixelBuffer = depthPixelBuffer.copy( )
```

Because the binary mask 213 may still introduce pixelated edges and, under an outdoor environment with strong lighting, the user's body contour may be partially cut off due to the roughness of the depth sensing, the method 200 further includes a smoothing process to generate a smoothed mask 219. First, the method 200 includes smoothing an edge of the binary mask by creating a first alpha matte on the binary mask. Second, the method 200 includes smoothing the binary mask by applying a gamma adjust process and a gaussian blur process. Third, the method 200 further includes transforming the binary mask to allow a drag-and-zoom feature. It is noted that alpha matte is opaque when a pixel value of the alpha channel is 100%, where the alpha channel is used for communicating transparency information.

In some implementations, the step of applying the gamma adjust process includes applying a CIGammaAdjust filter.

In some implementations, the step of applying the gaussian blur process includes applying a CIGaussianBlur filter.

One of the exemplary codes to achieve the above steps may be as follows:

```
// Create the mask from that pixel buffer.
    let depthOrientation = Util.imageOrientationToFixCaptureVideoOrientation(videoOrientation:
sessionManager.depthDataOutputConnection!.videoOrientation)
    let depthMaskImage = CIImage(cvPixelBuffer: depthPixelBuffer, options:
[:]).oriented(depthOrientation)
    let (blurRadius, gamma) = Util.superimposeConfig(brightness: lastBrightness)
    // Smooth edges to create an alpha matte, then upscale it to the RGB resolution.
    if frontVideoWidth == nil {
        frontVideoWidth = CVPixelBufferGetWidth(videoPixelBuffer)
    }
    if frontVideoHeight == nil {
        frontVideoHeight = CVPixelBufferGetHeight(videoPixelBuffer)
    }
    // Used max to be orientation-safe
    let alphaUpscaleFactor = Float(max(frontVideoHeight!, frontVideoWidth!)) /
Float(max(depthWidth, depthHeight))
    if frontImageTransform == nil {
        let backVideoWidth = backCamImage.extent.size.width
        let backVideoHeight = backCamImage.extent.size.height
        // Place front cam video at the bottom center
        let scale = backVideoWidth / CGFloat(frontVideoWidth!)
        frontImageTransform = CGAffineTransform(scaleX: scale, y: scale)
            .translatedBy(
            x: 0.0 / scale * backVideoWidth,
            y: 0.25 / scale * backVideoHeight)
        lastFrontImageTransform = frontImageTransform!
    }
    var blurredMask = depthMaskImage.clampedToExtent( )
        .applyingFilter("CIGaussianBlur", parameters: ["inputRadius": blurRadius])
        .applyingFilter("CIGammaAdjust", parameters: ["inputPower": gamma])
        .cropped(to: depthMaskImage.extent)
```

Fourth, in order for the filter combination to work well in different lighting conditions, a brightness data from Exchangeable image file format (EXIF) data of each frame is extracted, then using the brightness data to derive different filter parameter combinations. It is noted that EXIF is a standard that specifies the formats for images, sound, and ancillary tags used by digital cameras (including smartphones), scanners, and other systems handling image and sound files recorded by digital cameras.

One of the exemplary codes to achieve the above step may be as follows:

```
public static func getBrightness(sampleBuffer:CMSampleBuffer) -> Double {
    //Retrieving EXIF data of camera frame buffer
    let rawMetadata = CMCopyDictionaryOfAttachments(allocator: nil, target: sampleBuffer,
attachmentMode: CMAttachmentMode(kCMAttachmentMode_ShouldPropagate))
    let metadata = CFDictionaryCreateMutableCopy(nil, 0, rawMetadata) as
NSMutableDictionary
    let exifData = metadata.value(forKey: "{Exif}") as? NSMutableDictionary
    let brightness = exifData?.object(forKey: kCGImagePropertyExifBrightnessValue) as? Double
    return brightness ?? 0.0
}
// (blurRadius, gamma)
public static func superimposeConfig(brightness:Double) -> (Float, Float) {
    if brightness >= 7.8 {
        return (10.0, 0.12)
    } else if brightness > 5.0 {
        return (5.0, 0.2)
    } else {
        return (1.0, 1.0)
    }
}
```

Next, the method 200 includes merging the smoothed binary mask 219 with a first camera video output 209 which may be a selfie video output. A smoothed selfie video output 221 may be generated thereafter. To be more specific, in some implementations, the method 200 includes applying a second alpha matte to the selfie video output, correcting an orientation of the selfie video output, and applying CIBlendWithMask Filter to blend the selfie video output with the smoothed binary mask. A smoothed selfie video 221 is generated thereafter.

One of the exemplary codes to achieve the above steps may be as follows:

```
let alphaMatte = blurredMask
    .applyingFilter("CIBicubicScaleTransform", parameters: ["inputScale": alphaUpscaleFactor])
    .transformed(by: frontImageTransform!)
  let frontCamImageOrientation =
Util.imageOrientation ToFixCaptureVideoOrientation(videoOrientation:
sessionManager.frontCameraVideoDataOutputConnection!.videoOrientation)
  var frontCamImage = CIImage(cvPixelBuffer:
videoPixelBuffer).oriented(frontCamImageOrientation)
  frontCamImage = frontCamImage.transformed(by: frontImage Transform!)
  // Apply alpha matte to the video.
  let parameters = [
    "inputMaskImage": alphaMatte,
    "inputBackgroundImage": backCamImage
  ]
  let mergedImage = frontCamImage.applyingFilter("CIBlendWithMask", parameters:
parameters)
```

Finally, the method includes overlaying the smoothed selfie video 221 onto the back camera video 233 captured by the back camera. An overlaid video 235 is generated as a result.

Figure 3:
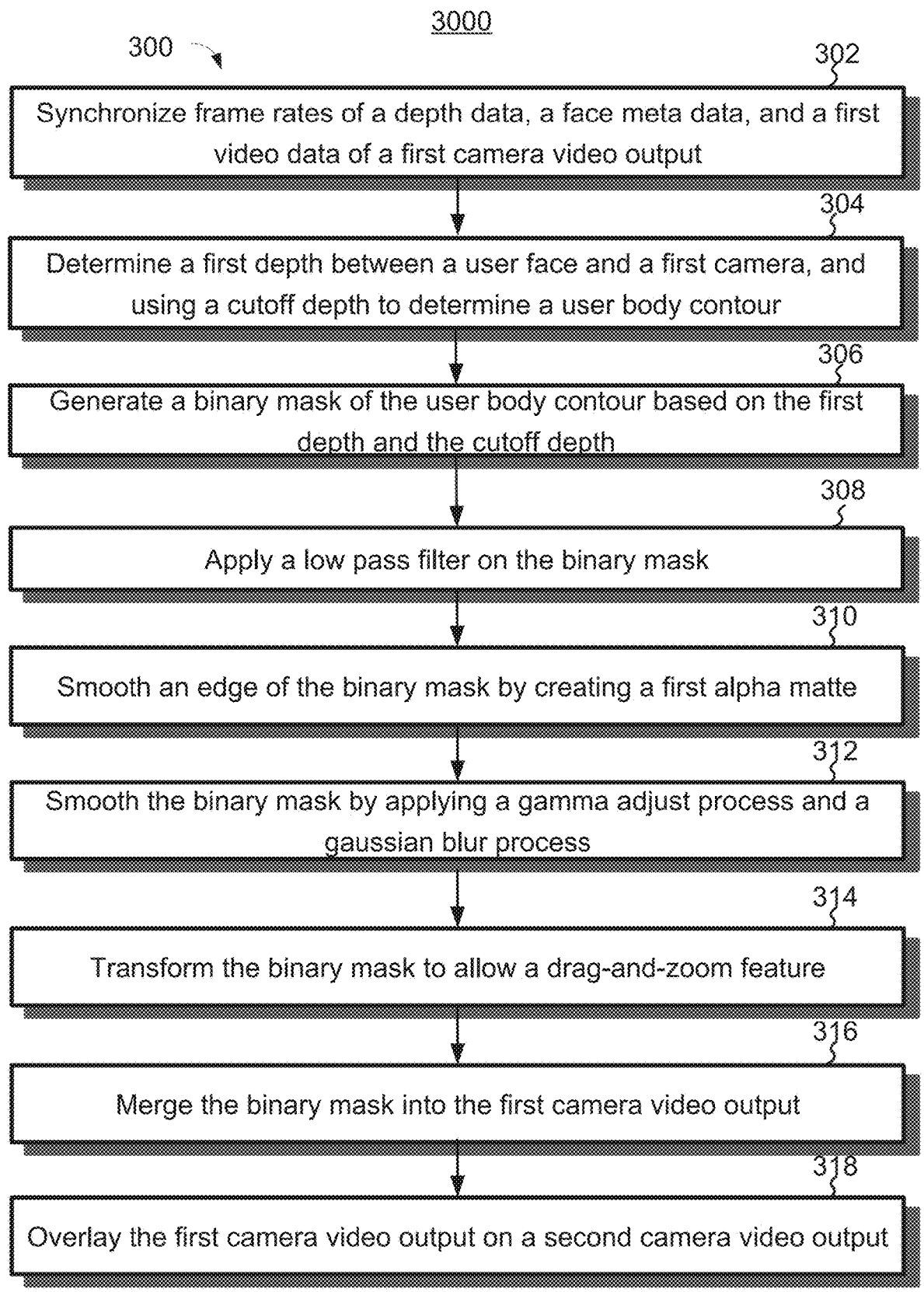
FIG. 3 is a flowchart illustrating a method of real-time video overlaying and superimposing display from multiple mutually synchronous cameras in accordance with some implementations of the present disclosure.

FIG. 3 is a flowchart 3000 illustrating a method 300 in accordance with some implementations of the present disclosure.

As shown in FIG. 3, the method 300 includes synchronizing frame rates of a depth data, a face meta data, and a video data of a first camera video output captured by a first camera (step 302); determining a first depth between a user face and the first camera via a depth sensor, and using a cutoff depth to determine a user body contour (step 304); generating a binary mask of the user body contour based on the first depth and the cutoff depth (step 306); applying a low pass filter on the binary mask (step 308); smoothing an edge of the binary mask by creating a first alpha matte onto the edge of the binary mask (step 310); smoothing the binary mask by applying a gamma adjust process and a gaussian blur process (step 312); transforming the binary mask to allow a drag-and-zoom feature (step 314); merging the binary mask with the first camera video output and generating a merged first camera video output (step 316); and overlaying the merged first camera video output onto a second camera video output captured by a second camera (318). In some implementations, the method 300 may be specified by adding more detailed steps of the method 200.

In some implementations, the first camera and the second camera are facing in the opposite direction.

In some implementations, the step of transforming the binary mask includes scaling the binary mask to the same size (height and width) as the second camera video output.

In some implementations, the step of transforming the binary mask further includes placing the binary mask at a position corresponding to a bottom center of the second camera video output.

In some implementations, the step of smoothing an edge of the binary mask by creating a first alpha matte onto the edge of the binary mask further includes upscaling the first alpha matte to RGB resolution.

Figure 5:
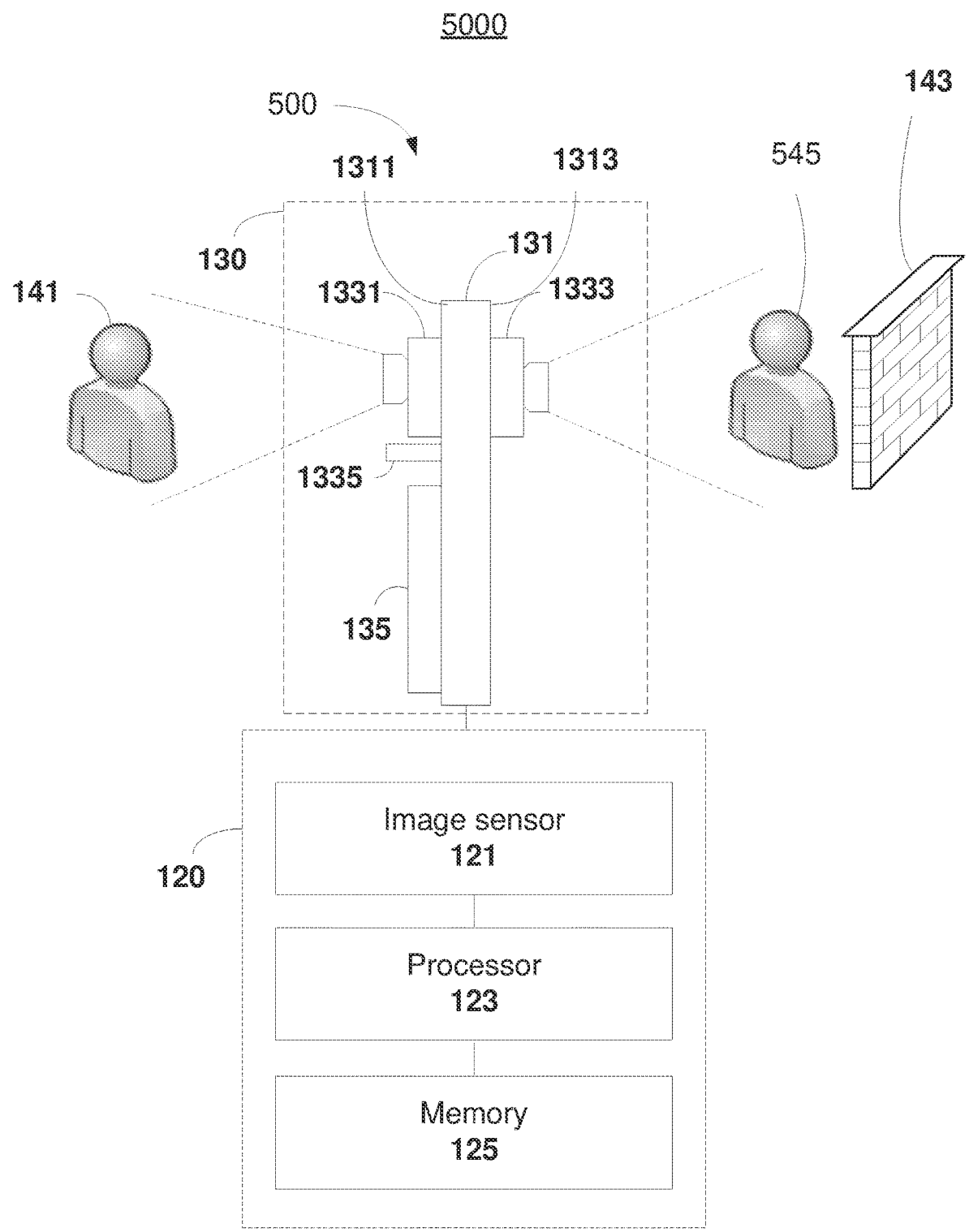
FIG. 5 is a schematic diagram illustrating an exemplary real-time video overlaying system in accordance with some implementations of the present disclosure.

FIG. 5 is a schematic diagram 5000 illustrating an exemplary real-time video overlaying system 500 in accordance with some implementations of the present disclosure.

Figure 6B:
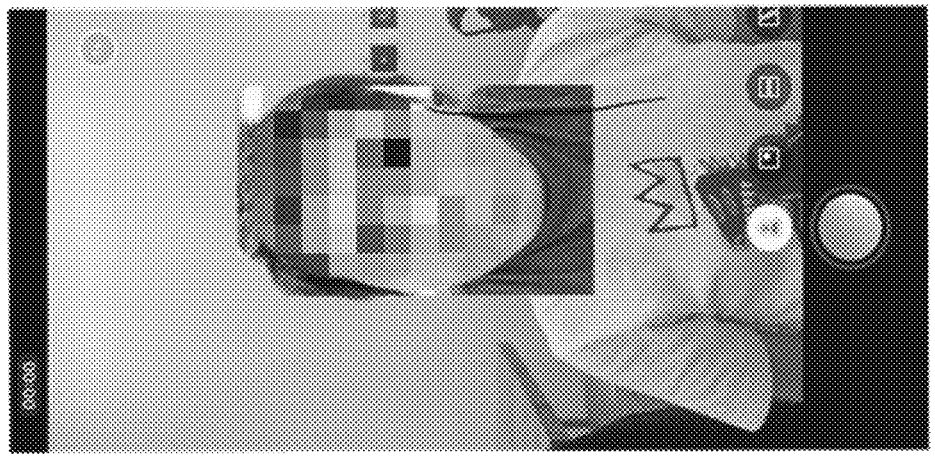
FIG. 6B is an exemplary image illustrating a result of the real-time video overlaying system in accordance with some implementations of the present disclosure.
Figure 6A:
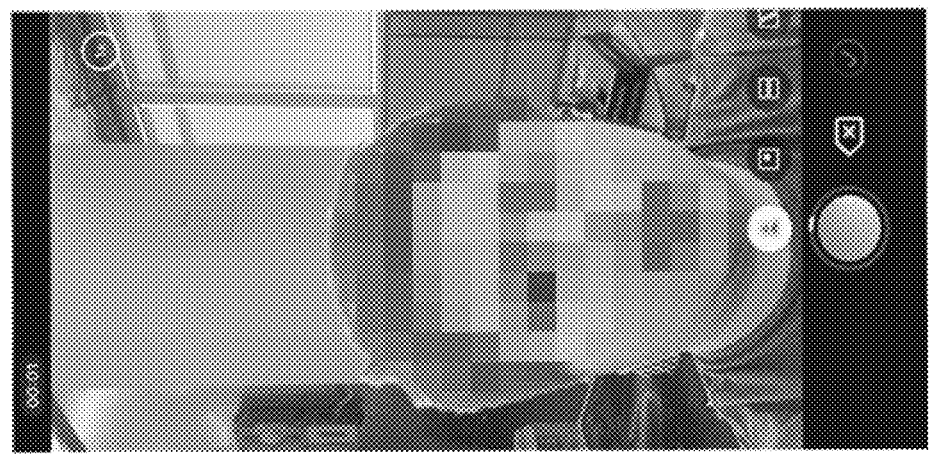
FIG. 6A is an exemplary image illustrating a result of the real-time video overlaying system and methods in accordance with some implementations of the present disclosure.

As shown in FIG. 5, it is basically the same as in FIG. 1. However, the realtime video overlaying system 100 is configured to overlay a selfie video of a front camera to a background video of a back camera, while the real-time video overlaying system 500 is configured to overlay a first selfie video of a first user face 141 shot by a front camera 1331 to a second selfie video of a second user face 545 shot by a back camera 1333. Since based on the method 200 and 300, coordinates of the front user face contour and the back user face contour may be detected and determined by the front and back camera accordingly, by overlaying and superimposing the front user face contour to the back user face contour according to the coordinates, the back user face may be replaced by the front user face. Furthermore, with the aid of the real-time coordinates and boundaries of the back user face contour, the front user face contour may be dynamically resized and placed over the back user face contour. FIG. 6A is an exemplary image illustrating a result of the real-time video overlaying system 100 and the method 200, 300 in accordance with some implementations of the present disclosure. FIG. 6B is an exemplary image illustrating a result of the real-time video overlaying system 500 in accordance with some implementations of the present disclosure.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation (s).

It will also be understood that, although the terms "first," "second," etc. may be used herein to describe various elements, these elements should not be limited by these terms. These terms are only used to distinguish one element from another. For example, a first column could be termed a second column, and, similarly, a second column could be termed the first column, without changing the meaning of the description, so long as all occurrences of the "first column" are renamed consistently and all occurrences of the "second column" are renamed consistently. The first column and the second are columns both columns, but they are not the same column.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for video content analysis comprising:
    capturing video output from a first camera on a first mobile device;
    recognizing an individual in the video output that was captured, wherein the recognizing determines a user body contour;
    generating a binary mask, wherein the binary mask enables real-time video processing, which includes separating the user body contour from a background of the video output from the first camera;
    temporarily buffering a last binary mask that corresponds to a last frame;
    mixing the last binary mask with a current binary mask that corresponds to a current frame, wherein the binary mask is based on a weighted combination of the last frame and the current frame, wherein the last frame has a weight of 0.4 and the current frame has a weight of 0.6;
    smoothing an edge of the binary mask, wherein smoothing the edge further comprises creating an alpha matte on the edge of the binary mask;
    merging the binary mask with the video output from the first camera, wherein the merging produces a merged first camera video output; and
    creating a composite video, wherein the merged first camera video output is overlaid onto a second camera video output, from a second camera.

2. The method of claim 1 wherein the first camera and the second camera are included on a first mobile device.

3. The method of claim 2 wherein the first camera and the second camera are facing in opposite directions.

4. The method of claim 1 wherein the first camera and the second camera are included on different devices.

5. The method of claim 1 wherein the first camera and the second camera are included on a wearable device.

6. The method of claim 1 wherein the composite video is displayed in an application running on the first mobile device.

7. The method of claim 1 further comprising sharing the composite video with a second mobile device.

8. The method of claim 7 wherein the sharing is accomplished using a website.

9. The method of claim 7 wherein the sharing is accomplished using a mobile application.

10. The method of claim 1 wherein the composite video is included in a livestream event.

11. The method of claim 1 further comprising capturing an image from the composite video.

12. The method of claim 11 wherein the image is displayed in an application running on the first mobile device.

13. The method of claim 12 wherein the image is shared with a second mobile device.

14. The method of claim 13 wherein sharing of the image is accomplished using a website.

15. The method of claim 13 wherein sharing of the image is accomplished using a mobile application.

16. The method of claim 1 wherein the video output from the first camera comprises a smoothed selfie video.

17. The method of claim 16 wherein the smoothed selfie video is shared with a second mobile device.

18. The method of claim 17 wherein the smoothed selfie video is overlaid with a second selfie video captured by the second mobile device.

19. The method of claim 1 wherein the smoothing of the binary mask includes applying a gamma adjust process and a gaussian blur process.

20. The method of claim 19 wherein the smoothing the binary mask further comprises transforming the binary mask to allow a drag-and-zoom feature.

21. The method of claim 20 further comprising scaling the binary mask to a same size as the second camera video output.

22. The method of claim 21 further comprising placing the binary mask at a position corresponding to a portion of the second camera video output.

23. The method of claim 1 wherein the smoothing an edge of a binary mask further comprises creating an alpha matte on the binary mask.

24. The method of claim 23 wherein the alpha matte is upscaled to RGB resolution.

25. The method of claim 1 further comprising synchronizing frame rates of depth data, face metadata, and video data of the first camera.

26. The method of claim 25 further comprising determining a first depth between a user face and the first camera.

27. The method of claim 26 further comprising using a cutoff depth to determine the user body contour.

28. The method of claim 27 wherein the generating a binary mask is based on the first depth and the cutoff depth.

29. The method of claim 25 wherein depth, for the depth data, is determined by a depth sensor.

30. The method of claim 1 further comprising applying a low pass filter on the binary mask.

31. The method of claim 1 further comprising employing a second alpha matte on the video output from the first camera.

32. The method of claim 31 further comprising correcting an orientation of the video output from the first camera.

33. The method of claim 32 further comprising combining the video output from the first camera with the binary mask.

34. A computer program product embodied in a non-transitory computer readable medium for video content analysis, the computer program product comprising code which causes one or more processors to perform operations of:
  capturing video output from a first camera on a first mobile device;
  recognizing an individual in the video output that was captured, wherein the recognizing determines a user body contour;
  generating a binary mask, wherein the binary mask enables real-time video processing, which includes separating the user body contour from a background of the video output from the first camera;
  temporarily buffering a last binary mask that corresponds to a last frame;
  mixing the last binary mask with a current binary mask that corresponds to a current frame, wherein the binary mask is based on a weighted combination of the last frame and the current frame, wherein the last frame has a weight of 0.4 and the current frame has a weight of 0.6;
  smoothing an edge of the binary mask, wherein smoothing the edge further comprises creating an alpha matte on the edge of the binary mask;
  merging the binary mask with the video output from the first camera, wherein the merging produces a merged first camera video output; and
  creating a composite video, wherein the merged first camera video output is overlaid onto a second camera video output, from a second camera.

35. A computer system for video content analysis comprising:
  a memory which stores instructions;
  one or more processors attached to the memory wherein the one or more processors, when executing the instructions which are stored, are configured to:
    capture video output from a first camera on a first mobile device;
    recognize an individual in the video output that was captured, wherein recognition determines a user body contour;
    generate a binary mask, wherein the binary mask enables real-time video processing, which includes separating the user body contour from a background of the video output from the first camera;
    temporarily buffer a last binary mask that corresponds to a last frame;
    mix the last binary mask with a current binary mask that corresponds to a current frame, wherein the binary mask is based on a weighted combination of the last frame and the current frame, wherein the last frame has a weight of 0.4 and the current frame has a weight of 0.6;
    smooth an edge of the binary mask, wherein smoothing the edge further comprises creating an alpha matte on the edge of the binary mask;
    merge the binary mask with the video output from the first camera, wherein merging produces a merged first camera video output; and
    create a composite video, wherein the merged first camera video output is overlaid onto a second camera video output, from a second camera.

* * * * *